US008086106B2

(12) United States Patent
Nakamura

(10) Patent No.: US 8,086,106 B2
(45) Date of Patent: Dec. 27, 2011

(54) WDM OPTICAL TRANSMISSION SYSTEM AND CONTROLLING METHOD THEREOF

(75) Inventor: Kentaro Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 448 days.

(21) Appl. No.: 12/453,063

(22) Filed: Apr. 28, 2009

(65) Prior Publication Data

US 2010/0028003 A1 Feb. 4, 2010

(30) Foreign Application Priority Data

Jul. 31, 2008 (JP) ................................. 2008-197392

(51) Int. Cl.
 *H04J 14/02* (2006.01)
(52) U.S. Cl. ........................... 398/79; 398/97; 359/341.4
(58) Field of Classification Search ........................ None
 See application file for complete search history.

(56) References Cited

U.S. PATENT DOCUMENTS

| 7,606,488 | B2* | 10/2009 | Sugaya | 398/34 |
| 7,715,093 | B2* | 5/2010 | Nishihara et al. | 359/337.1 |
| 7,843,631 | B2* | 11/2010 | Onaka et al. | 359/341.41 |
| 7,899,331 | B2* | 3/2011 | Itoh et al. | 398/97 |
| 2002/0041431 | A1 | 4/2002 | Ohshima et al. | |
| 2003/0025990 | A1* | 2/2003 | DeGrange et al. | 359/341.4 |
| 2003/0081283 | A1* | 5/2003 | Ishizuka et al. | 359/124 |
| 2006/0056011 | A1* | 3/2006 | Iizuka et al. | 359/337 |
| 2008/0080867 | A1* | 4/2008 | Itoh et al. | 398/97 |
| 2008/0239470 | A1* | 10/2008 | Nishihara et al. | 359/337.1 |
| 2009/0091819 | A1* | 4/2009 | Bolshtyansky et al. | 359/334 |
| 2010/0091357 | A1* | 4/2010 | Ueki et al. | 359/337.13 |
| 2010/0158532 | A1* | 6/2010 | Goto et al. | 398/81 |

FOREIGN PATENT DOCUMENTS

WO 02/21203 A1 3/2002

* cited by examiner

*Primary Examiner* — Shi K Li
*Assistant Examiner* — Rajsheed Black-Childress
(74) *Attorney, Agent, or Firm* — Staas & Halsey LLP

(57) ABSTRACT

In the WDM optical transmission system, when performing a correction of a control target value of the total light intensity per one channel of the WDM light in each node on a transmission path, a correction value calculation section of each node determines the type of its own node, and if it corresponds to a node (for example, OADM node) that demultiplexes the WDM light into individual channels and performs a predetermined processing, performs correction of the control target value of the total light intensity according to a calculation expression with use of a noise cut ratio. The noise cut ratio is defined according to a filtering characteristic for when demultiplexing the WDM light into individual channels, so that the influence due to removal of the noise components distributed across the intermediate region of each channel due to filtering is reflected in the correction processing of the control target value of the total light intensity.

13 Claims, 12 Drawing Sheets

WDM OPTICAL TRANSMISSION SYSTEM AND CONTROLLING METHOD THEREOF

CROSS-REFERENCE TO RELATED APPLICATION

This application is based upon and claims the benefit of priority of the prior Japanese Patent Application No. 2008-197392, filed on Jul. 31, 2008, the entire contents of which are incorporated herein by reference.

FIELD

The embodiment discussed herein is related to a WDM optical transmission system for repeatedly transmitting wavelength division multiplexing (WDM) light containing a plurality of optical signals with different wavelengths, and a controlling method thereof. Furthermore, the present invention includes a WDM optical transmission system having nodes on a transmission path that demultiplex WDM light into optical signals of respective wavelengths and perform a predetermined processing, and a controlling method thereof.

BACKGROUND

In a WDM optical transmission system that amplifies and repeatedly transmits WDM light with an optical repeater arranged on a transmission path, the intensity of the WDM light amplified by the optical repeater to be input to a transmission path fiber that connects to an output side of the optical repeater (hereunder, referred to as fiber input light intensity) is one of the important parameters that determine the characteristic of the system. If this fiber input light intensity becomes too low, the optical signal to noise ratio (OSNR) becomes deteriorated. On the other hand, if the fiber input light intensity becomes too high, the transmission quality becomes deteriorated due to the nonlinear effect within the optical fiber. Consequently, generally in an optical repeater, the intensity of the WDM light amplified with use of an optical amplifier is monitored, and according to the monitoring results, the optical amplifier is controlled so that the light intensity per one channel of the WDM light becomes constant. This channel means an optical signal of each wavelength contained in the WDM light.

However, for example as illustrated at the top of FIG. 14, in a system in which a plurality of optical repeaters 104 are arranged on a transmission path 103 between a transmitting station 101 and a receiving station 102, and WDM light is sequentially amplified and transmitted by each optical repeater 104, optical noise that occurs in an optical amplifier within each optical repeater accumulates. Consequently, even if a control in each optical repeater 104 is performed to make the light intensity per one channel constant, as illustrated on the bottom of FIG. 14, the proportion of signal components among signal components and noise components contained in each channel gradually decreases with an increase in the number of repeaters.

FIG. 15 is an example illustrating changes in the proportion of the light intensity of the signal component and the light intensity of the noise component according to the number of spans, for the WDM light input to the transmission path of each repeater section (span). Moreover, FIG. 16 is an example illustrating changes in the signal light intensity in one channel according to the number of spans. As seen in the example of each diagram, each channel of the WDM light is such that even if the light intensity for where the signal component and the noise component are combined (hereunder, referred to as total light intensity) is controlled to be constant, the noise light intensity increases with an increase in the number of spans, and the signal light intensity decreases. Therefore, the actual signal light intensity (square dots in FIG. 16) becomes smaller than the required signal light intensity (rhombic dots in FIG. 16) at which reception processing of each channel can be normally performed under the control to make the total light intensity constant, and the difference thereof increases corresponding to the increase in the number of spans.

As a conventional technique to reduce such OSNR deterioration, for example as illustrated in FIG. 17, for the control of an optical amplifier in each optical repeater, there has been proposed a method of correcting a control target value of the total light intensity per one channel, to correspond to the increase in the noise light intensity due to the increase in the number of spans (for example, refer to International Publication Pamphlet No. WO 02/021203). According to this conventional technique, as illustrated in FIG. 18, the signal light intensity is maintained at a constant level even if the noise light intensity increases due to the increase in the number of spans. Therefore a required signal light intensity can be achieved regardless of the number of spans.

To describe specifically, for example, when a WDM optical transmission system illustrated at the top of FIG. 19 in which a plurality of OADM nodes 105 are arranged on the transmission path 103, in each OADM node 105, the WDM light transmitted through the transmission path 103 is amplified to a required level by an input side optical amplifier, and is then provided to an OADM unit. In the OADM unit, a demultiplexer demultiplexes the WDM light for each channel, an add/drop processing is performed for each channel, and the respective channels are multiplexed again by a multiplexer. Then the WDM light processed in the OADM unit is amplified to a required level by an output side optical amplifier, and sent to the transmission path 103.

In such an OADM node 105, when the WDM light is demultiplexed for each channel in the demultiplexer in the OADM unit, noise components distributed across the intermediate wavelength region of the respective channels are filtered and removed. Consequently, the noise light contained in the WDM light processed in the OADM node 105 only has remaining components corresponding to the wavelength width of each channel as illustrated at the bottom of FIG. 19. Therefore, the WDM light sent from the OADM node 105 to the transmission path 103, compared to the WDM light (refer to the bottom of FIG. 17) sent from an optical repeater node 104 that contains an optical amplifier but does not contain an OADM (hereunder, may be referred to as in-line amplifier (ILA)), to the transmission path 103, has its noise components reduced.

With respect to the above OADM node 105 that filters the noise component, in the case of performing, with the conventional technique mentioned above, a correction of the control target value of the total light intensity similar to that in the case of the optical repeater node 104, the amount of increase in the noise component is estimated at a level greater than that of the actual increase. Therefore the control target value of the total light intensity is excessively corrected. If a constant control of the output light intensity is performed in the OADM node 105, according to the control target value of the total light intensity corrected in this way, the signal light intensity of each channel of the WDM light input to the output side transmission path 103 of the OADM node 105 exceeds the required level thereof, and there is a possibility of a transmission quality deterioration due to the nonlinear effect.

FIG. 20 is an example illustrating changes in the proportion of the light intensity of the signal component and the light intensity of the noise component according to the number of spans, for the WDM light input to the transmission path between the respective repeater sections in the case where the OADM nodes are arranged in multiple stages on the transmission path. Moreover, FIG. 21 is an example illustrating changes in the signal light intensity in one channel according to the number of spans. As described above, each channel of the WDM light is such that the proportion of the signal light intensity with respect to the noise light intensity increases with the increase in the number of spans, the actual signal light intensity (square dots in FIG. 21) becomes greater than the required signal light intensity (rhombic dots in FIG. 21), and the difference therebetween expands corresponding to the increase in the number of the spans. Consequently, transmission quality deterioration due to the nonlinear effect is likely to occur in a system containing a number of OADM nodes on a transmission path thereof.

SUMMARY

According to an aspect of the invention, a WDM optical transmission system is that there are provided: a transmission path through which WDM light containing a plurality of channels with different wavelengths is transmitted; at least one first node that is arranged on the transmission path, and that demultiplexes WDM light input from the transmission path into individual channels, and then performs a predetermined processing for each channel, and amplifies the WDM light with the multiplexed respective processed channels with an optical amplifier to be output to the transmission path; and at least one second node that is arranged on the transmission path, and that amplifies the WDM light input from the transmission path without demultiplexing it into individual channels, with an optical amplifier to be output to the transmission path. Moreover, the first node and the second node each have: a light intensity monitor that monitors the intensity of the WDM light amplified by the optical amplifier within its own node; a gain control section that controls gain of the optical amplifier according to the monitoring results of the light intensity monitor, so that the total light intensity combining signal components and noise components per one channel of the WDM light output from its own node to the transmission path, becomes constant at a preliminarily set control target value; and a correction value calculation section that, based on the monitoring results of the light intensity monitor, finds the proportion of the signal light intensity and the noise light intensity of one channel of the WDM light, and corrects the control target value of the total light intensity to be used in the gain control section so that the signal light intensity of one channel becomes constant in all of the nodes. Furthermore, the correction value calculation section determines whether its own node corresponds to either of the first node and the second node, and when it corresponds to the first node, it performs a correction of the control target value of the total light intensity according to a calculation expression with use of a noise cut ratio defined according to a filtering characteristic for when demultiplexing the WDM light into individual channels.

In the WDM optical transmission system described above, when performing a correction of the control target value of the total light intensity per one channel of the WDM light in each node on the transmission path, the correction value calculation section of each node determines the type of its own node, and if determined to correspond to the first node, performs correction processing of the control target value of the total light intensity according to a calculation expression with use of a noise cut ratio. This noise cut ratio is defined according to the filtering characteristic for when demultiplexing the WDM light into individual channels, so that the influence due to removal of the noise components distributed across the intermediate wavelength region of each channel due to filtering is reflected in the correction processing of the control target value of the total light intensity. As a result, the excessive correction conventionally observed, is avoided.

Consequently, according to the WDM optical transmission system, even if the first node and the second node are both present on the transmission path, it is possible to control the signal light intensity of each channel of the WDM light output from each node to a constant level at a high accuracy. Therefore excellent transmission quality can be realized.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereunder is a description of an embodiment of the present invention, with reference to the accompanying drawings.

Figure 1:
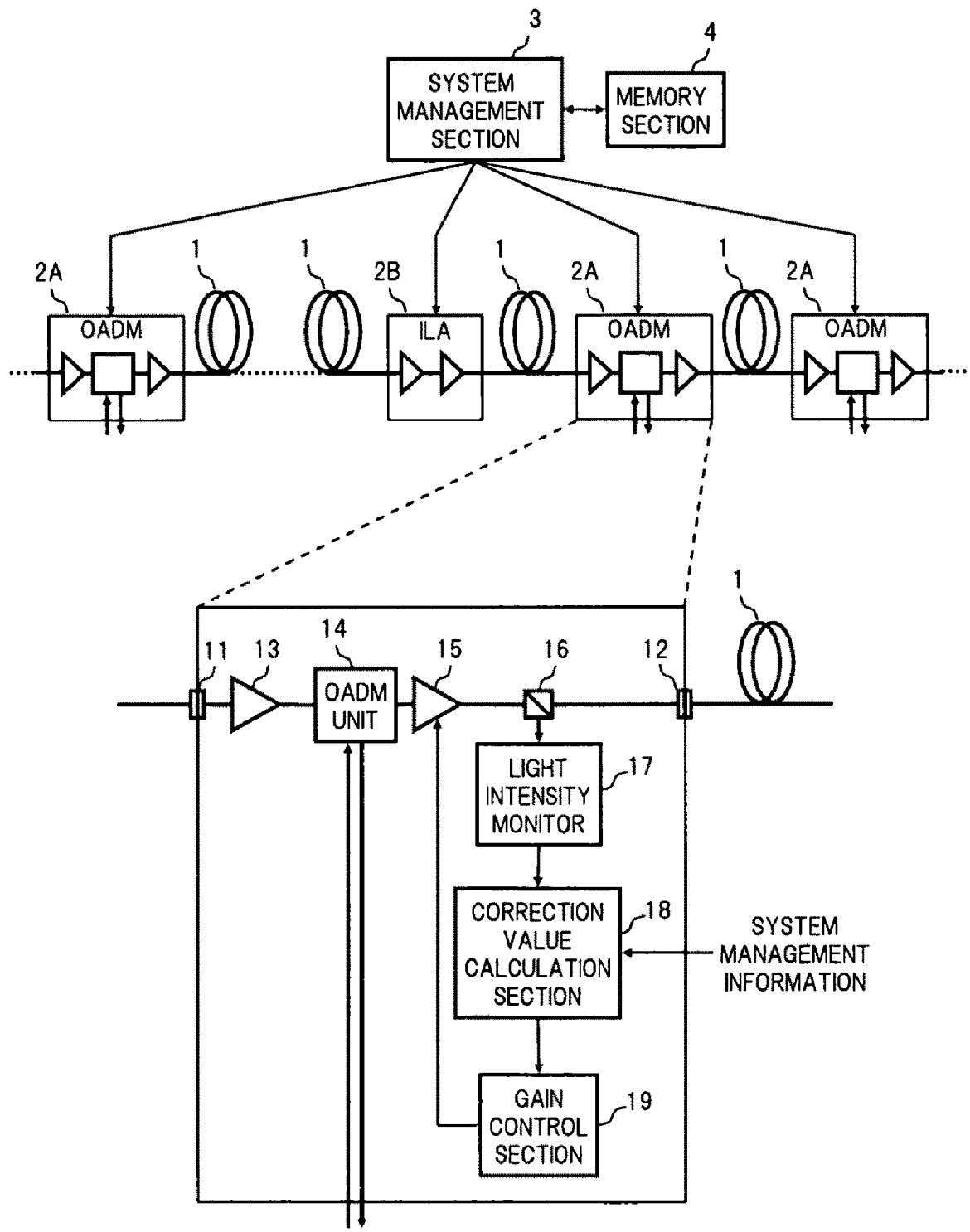
FIG. 1 is a block diagram illustrating a configuration of an embodiment of the present WDM optical transmission system.

FIG. 1 is a block diagram illustrating a configuration of an embodiment of a WDM optical transmission system.

In FIG. 1, the WDM optical transmission system of the present embodiment is provided with OADM nodes 2A and optical repeater nodes 2B arranged on a transmission path 1 as first and second nodes, and has a system management section 3 that performs central management of operating states of these respective nodes, and a memory section 4 connected to the system management section 3.

Figure 14:
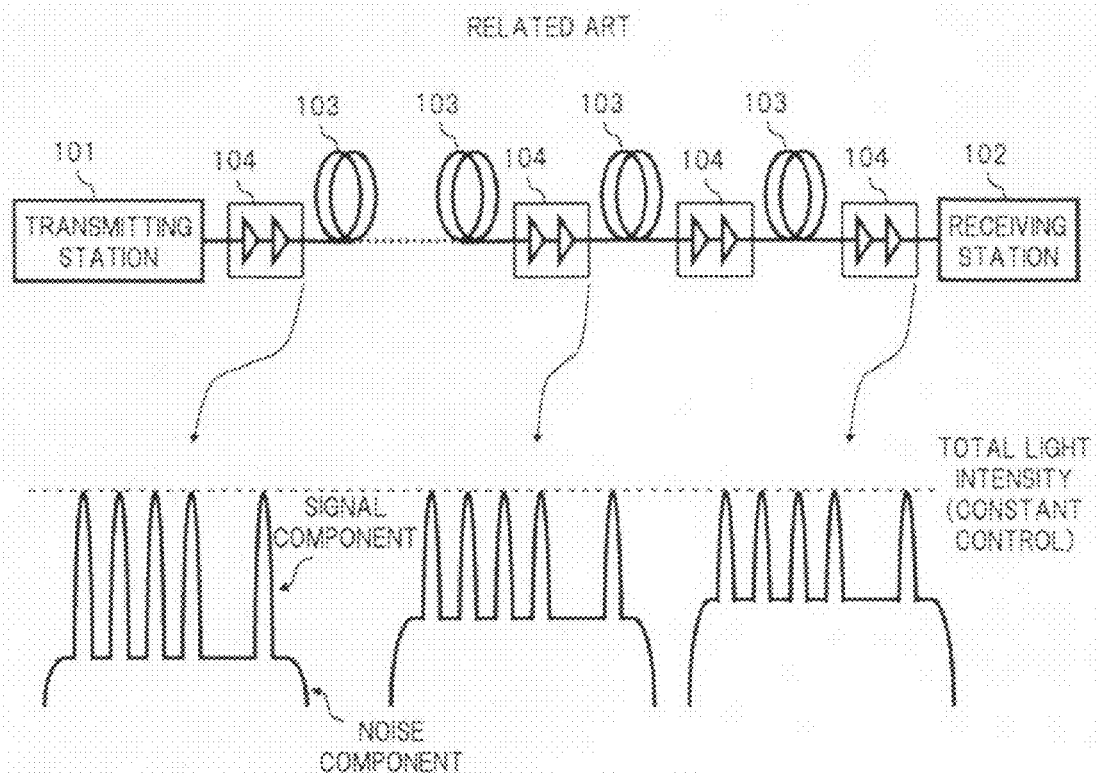
FIG. 14 is a diagram illustrating an example of a general WDM optical transmission system in which a plurality of optical repeaters are arranged on a transmission path.
Figure 15:
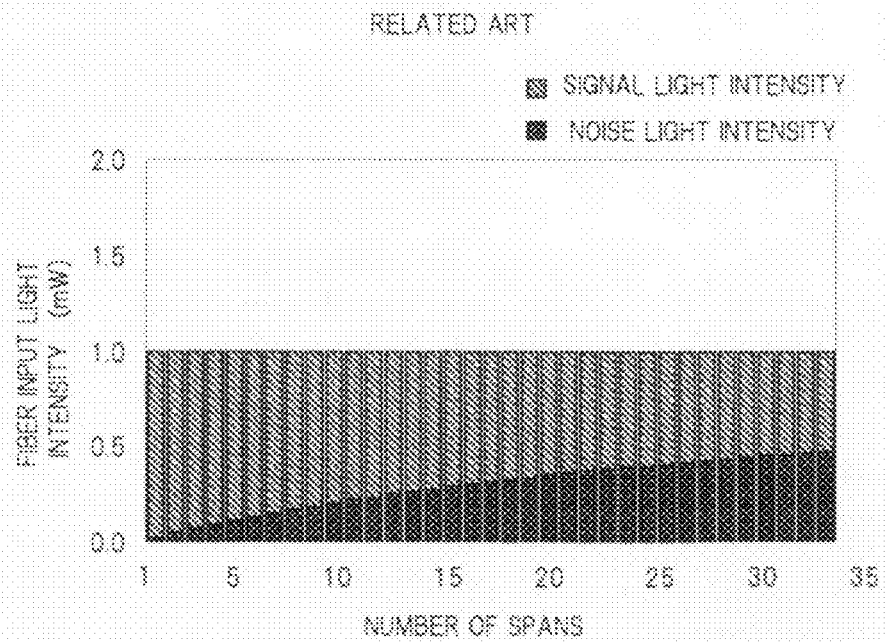
FIG. 15 is a diagram illustrating changes in the proportion of signal light intensity and noise light intensity according to the number of spans, in the system of FIG. 14.
Figure 16:
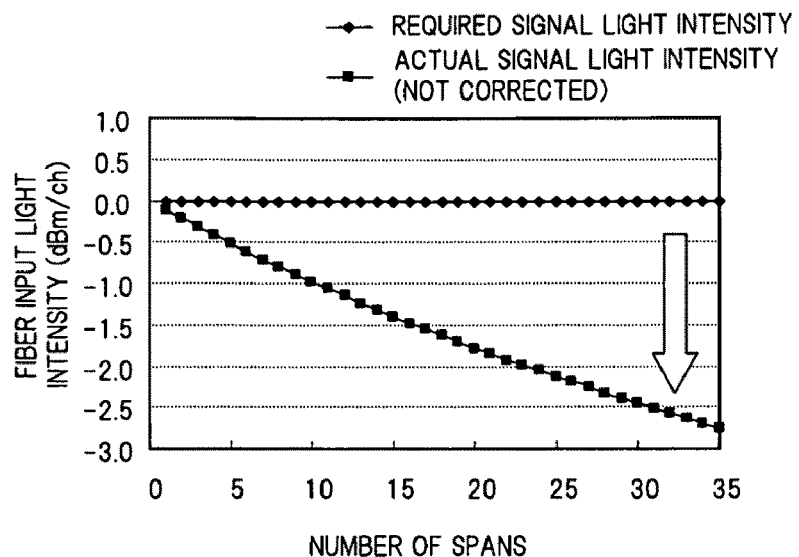
FIG. 16 is a diagram illustrating changes in signal light intensity in one channel according to the number of spans, in the system of FIG. 14.

The transmission path 1 is connected between the respective nodes on the system with use of general optical fibers. As with the case illustrated in FIG. 14 above, this transmission path 1 may be such that a transmitting station and a receiving station are connected to both ends thereof. Moreover the connection mode may be ring form or mesh form.

The OADM node 2A is provided with a function to perform adding/dropping of each channel with respect to WDM light being transmitted on the transmission path 1. A specific configuration example of this OADM node 2A is illustrated enlarged at the bottom of FIG. 1. In this configuration example, on an optical path between an input port 11 and an output port 12 of the OADM node 2A, there are arranged an input side optical amplifier 13, an OADM unit 14, and an output side optical amplifier 15, in this order. Moreover, between the output side optical amplifier 15 and the output port 12 there is provided an optical divider 16. The optical divider 16 takes out part of WDM light output from the output side optical amplifier 15 to the output port 12. To a branch port of this optical divider 16 there are connected a light intensity monitor 17, a correction value calculating section 18, and a gain control section 19 in this order. The gain of the output side optical amplifier 15 is feedback-controlled by the gain control section 19 as described in detail later.

The input side and output side optical amplifiers 13 and 15 of the OADM node 2A are commonly known optical amplifiers that are capable of amplifying each channel of input WDM light all together.

The OADM unit 14 demultiplexes the WDM light that has been amplified by the input side optical amplifier 13, into optical signals (channels) of respective wavelengths. For the respective channels, there are performed: processing for taking out a channel that is assigned to a drop wavelength in the setting of the node to the outside; and processing for inserting add light that is provided from the outside to the channel assigned to the adding wavelength. Furthermore, the respective channels that have been add/drop processed are multiplexed again and output to the output side optical amplifier 15.

Figure 2:
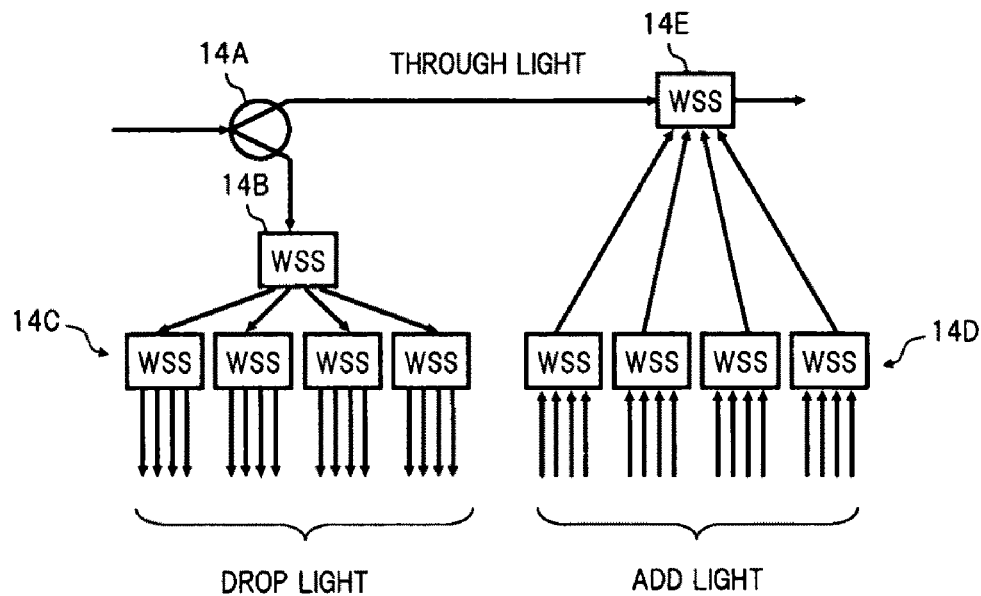
FIG. 2 is a diagram illustrating a configuration example of an OADM unit using WSS in the embodiment.
Figure 3:
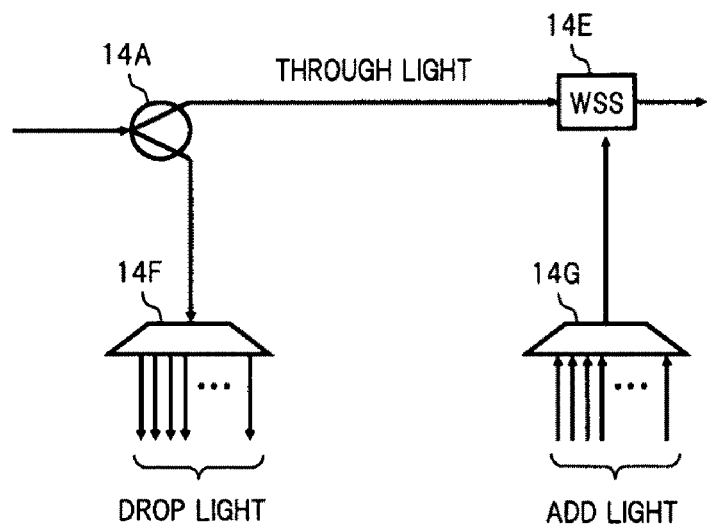
FIG. 3 is a diagram illustrating another configuration example of the OADM unit using WSS in the embodiment.
Figure 4:
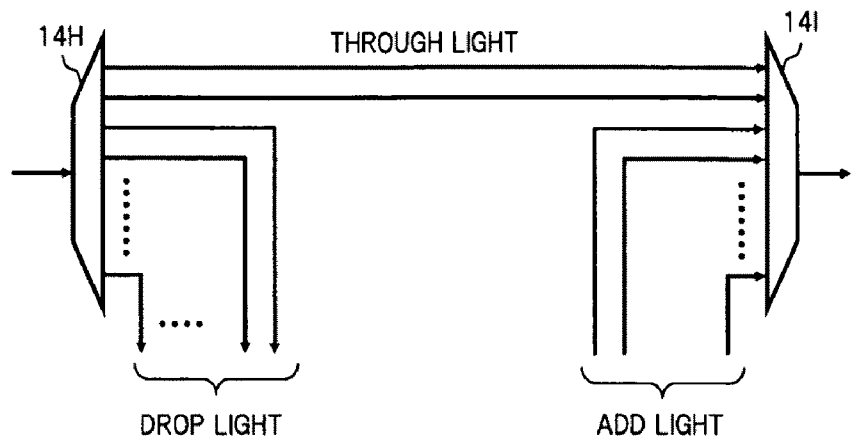
FIG. 4 is a diagram illustrating a configuration example of an OADM unit using an AWG in the embodiment.
Figure 5:
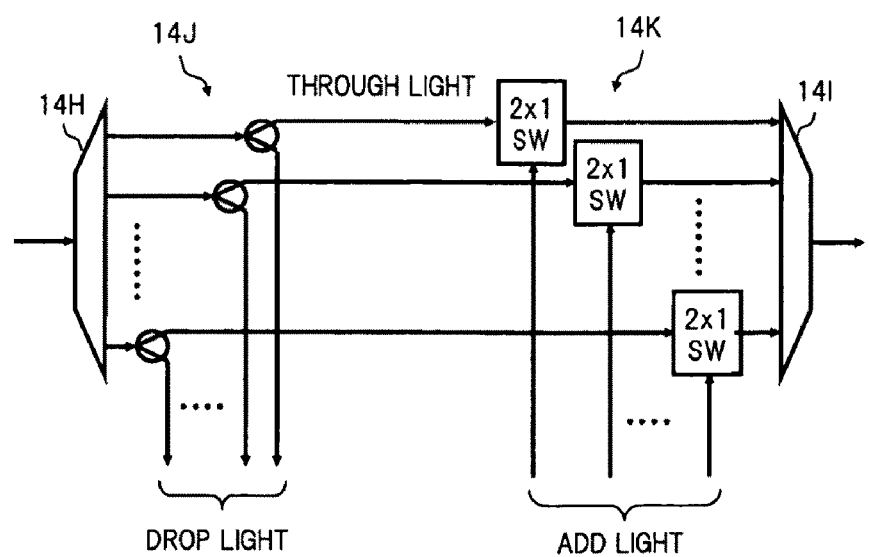
FIG. 5 is a diagram illustrating another configuration example of the OADM unit using an AWG in the embodiment.

FIG. 2 to FIG. 5 illustrate specific configuration examples of the OADM unit 14. FIG. 2 and FIG. 3 are configuration examples in which there is utilized a commonly known wavelength selective switch (WSS) that switches optical paths between a plurality of input/output ports with a combination of a spectral device, a movable mirror, and the like. Moreover, FIG. 4 and FIG. 5 are configuration examples in which a general arrayed waveguide grating (AWG) is used.

In the configuration example of FIG. 2, a WDM light input to the OADM unit 14 is branched into two at an optical divider 14A to be sent to respective WSS 14B and WSS 14E. In the WSS 14B, among the respective channels contained in the branched light from the optical divider 14A, channels corresponding to the dropping wavelength of the aforementioned node are separated into a plurality of groups and taken out. Then the light of the respective groups is separated into individual channels by a respectively corresponding WSS 14C to be output to the outside as drop light. On the other hand, add light externally provided to the node, is multiplexed for each of a plurality of groups by a WSS 14D, and is then provided to the WSS 14E. In the WSS 14E, among the respective channels contained in the branched light from the optical divider 14A, channels that correspond to the through wavelength of the node, and output light from each WSS 14D, are multiplexed to be output to the output side optical amplifier 15. In this configuration example of the OADM unit 14, when multiplexing/demultiplexing WDM light in the respective WSS 14B to 14E, noise components distributed across the intermediate wavelength region of each channel are removed due to the filtering characteristic of each WSS.

Moreover, as a modified example related to the OADM unit 14 of FIG. 2 above, FIG. 3 illustrates a configuration example in which a single AWG 14F is used instead of a plurality of the WSS 14B and 14C on the drop side, and a single AWG 14G is used instead of a plurality of the WSS 14D on the add side.

Furthermore, in the configuration example of FIG. 4, the WDM light to be input to the OADM unit 14 is provided to an AWG 14H to be thereby demultiplexed into individual channels, and among the respective channels, the channel that corresponds to the dropping wavelength of the node is output to the outside as drop light, while the channel that corresponds to the through wavelength is sent to an AWG 14I. Add light that is externally provided to the node is also input to the AWG 14I, and the through light from the AWG 14H and the add light is multiplexed to be output to the output side optical amplifier 15. In this configuration example of the OADM unit 14, when demultiplexing WDM light into individual channels in the input side AWG 14H, noise components distributed across the intermediate wavelength region of each channel are removed due to the filtering characteristic of the AWG 14H.

Moreover, as a modified example related to the OADM unit 14 of FIG. 4, FIG. 5 illustrates a configuration example in which: the respective channels demultiplexed in the AWG 14H are respectively branched into two at an optical divider 14J; one of the branched light that serves as drop light and the other branched light that serves as through light are provided to 2×1 optical switches 14K; and either one of the through light and add light is selected by the optical switch 14K to be provided to the output side AWG 14I. In this configuration example of FIG. 5, it is possible, with switching of each optical switch 14K, to appropriately change the setting of the through wavelength and adding wavelength at the node.

The optical divider 16 (bottom of FIG. 1) receives an input of WDM light amplified by the output side optical amplifier 15, and the WDM light is branched into two at a required ratio. Then, one branched light is output from the output port 12 to the transmission path 1, while the other branched light is output to the light intensity monitor 17. The light intensity monitor 17 monitors the intensity of WDM light branched by the optical divider 16, and transmits monitoring results thereof to the correction value calculation section 18. Based on the monitoring results from the light intensity monitor 17, the correction value calculation section 18 calculates a total light intensity, OSNR, and signal light intensity of the channel, per one channel for the WDM light that is output from the node and input to the transmission path 1, and with use of the calculation results, it performs correction of a control target value of the total light intensity.

Figure 6:
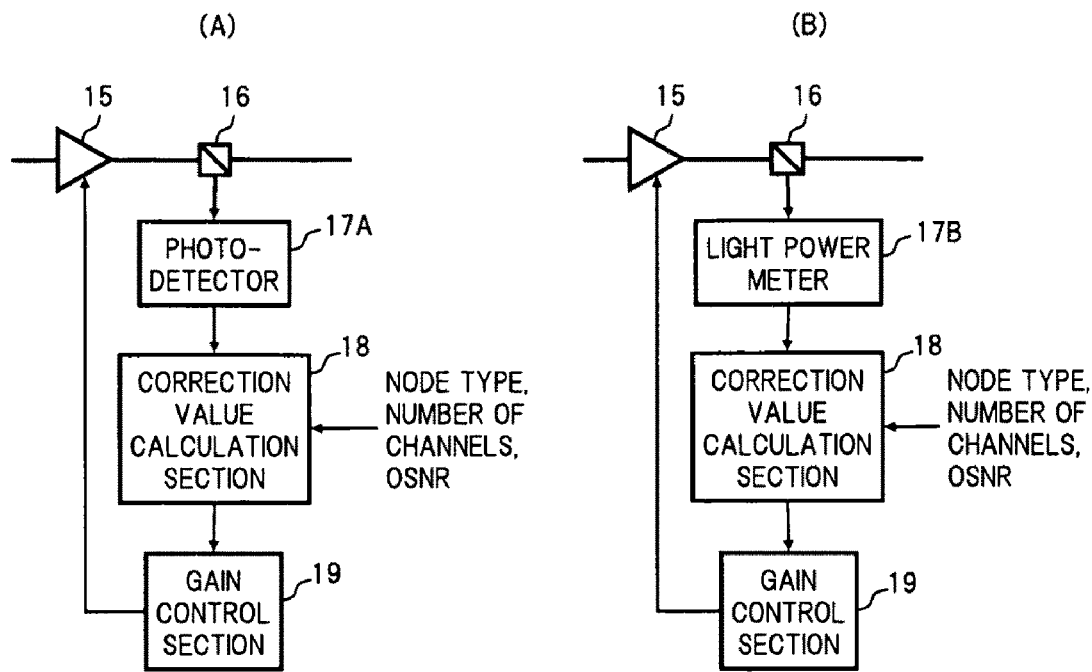
FIG. 6 is a diagram illustrating specific examples of a light intensity monitor in the embodiment, and the configuration of peripheral circuits corresponding thereto.

FIG. 6 is a diagram illustrating specific examples of the above light intensity monitor, and the configuration of peripheral circuits corresponding thereto. In (A) of FIG. 6, a photodetector 17A is used as the light intensity monitor 17, and in (B) of FIG. 6, a light power meter 17B is used as the light intensity monitor 17. In either of the specific examples, in the light intensity monitor 17, the total sum of the light intensity of all of the channels contained in the WDM light (hereunder, referred to as all the light intensity of the WDM light) is monitored. In this case, the correction value calculation section 18 uses a monitor value of all the light intensity of the WDM light transmitted from the light intensity monitor 17, and information related to the number of channels of the WDM light transmitted from the system management section 3 (FIG. 1), to calculate a total light intensity per one channel (signal component+noise component). Moreover, as for the OSNR of each channel, information related to the OSNR of the node transmitted from the system management section 3 is used. Then with use of the total light intensity and OSNR, a signal light intensity of one channel is calculated according to the calculation expression described later, and the acquired total light intensity and signal light intensity, or the OSNR value is used to perform correction of the control target value of the total light intensity.

Figure 7:
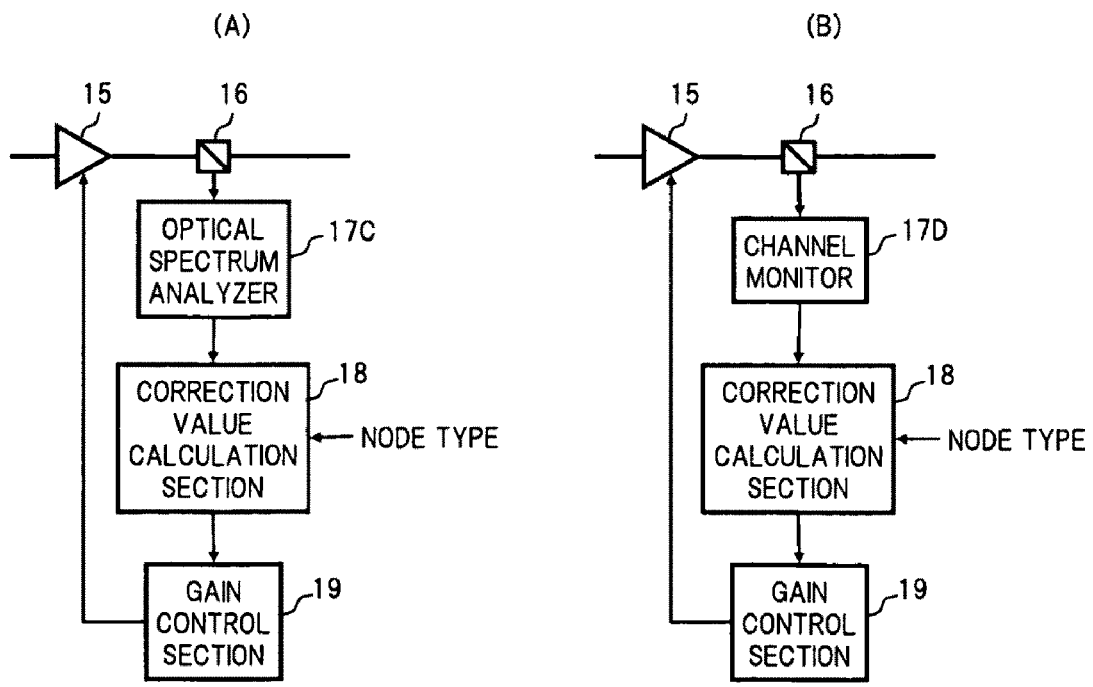
FIG. 7 is a diagram illustrating other specific examples of the light intensity monitor in the embodiment, and the configuration of peripheral circuits corresponding thereto.

The examples of FIG. 6 above illustrate a case of monitoring all the light intensity of the WDM light with the light intensity monitor 17. However, each value of the total light intensity, signal light intensity, and OSNR, per one channel of the WDM light may be monitored with the light intensity monitor 17, with use of an optical spectrum analyzer 17C that serves as the light intensity monitor 17 as illustrated in (A) of FIG. 7, or with use of a channel monitor 17C that serves as the light intensity monitor 17 as illustrated in (B) of FIG. 7. In this case, the correction value calculation section 18 uses the respective monitor values transmitted from the light intensity monitor 17 to perform correction of the control target value of the total light intensity.

The gain control section 19, according to the control target value of the total light intensity corrected by the correction value calculation section 18, performs feedback control of a gain at the output side optical amplifier 15 so that the total light intensity per one channel of the WDM light to be input to the transmission path 1 connected to the output port 12 becomes constant at the control target value.

Figure 8:
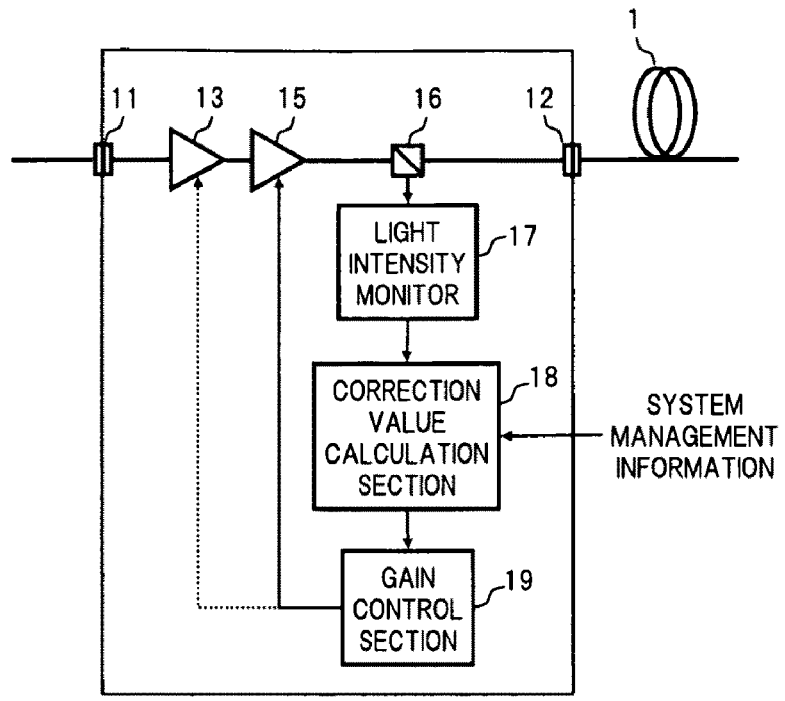
FIG. 8 is a diagram illustrating a configuration example of an optical repeater unit in the embodiment.

With respect to the OADM node 2A configured as described above, the optical repeater node 2B, for example as illustrated in FIG. 8, has a configuration in which the OADM unit 14 of the OADM node 2A is omitted. Constituent elements the same as those in the OADM node 2A are given the same reference symbols, and descriptions thereof are omitted. This optical repeater node 2B does not have a function to demultiplex WDM light input from the transmission path 1 into individual channels, and has a function as an inline amplifier (ILA) that amplifies all channels contained in the WDM light all together in the optical amplifiers 13 and 15 to be output to the transmission path 1.

The system management section 3 transmits system management information to each node on the transmission path to thereby perform central management of the operating state of each node. The system management information transmitted from the system management section 3 to each node at least contains information related to the type of the node, and in the case where, as described above, the light intensity monitor 17 only monitors all the light intensity of WDM light, there is also added information related to the number of channels and OSNR of the WDM light. This system management information is compiled into a database for each node and preliminarily stored in the memory section 4. The system management section 3 can be realized by a network management system (NMS) that is provided in a general WDM optical transmission system.

Next, an operation of the WDM optical transmission system of the present embodiment is described in detail, focusing on a control of the WDM light intensity output from each node to the transmission path.

In the WDM optical transmission system with the configuration described above, according to the system management information transmitted from the system management section 3, the correction value calculation section 18 provided in the respective nodes 2A and 2B on the transmission path 1 determines the type of its own node; in this case, whether the type of its own node is an OADM node or an optical repeater node. It then executes correction of the control target value of the total light intensity corresponding to the node type.

Figure 17:
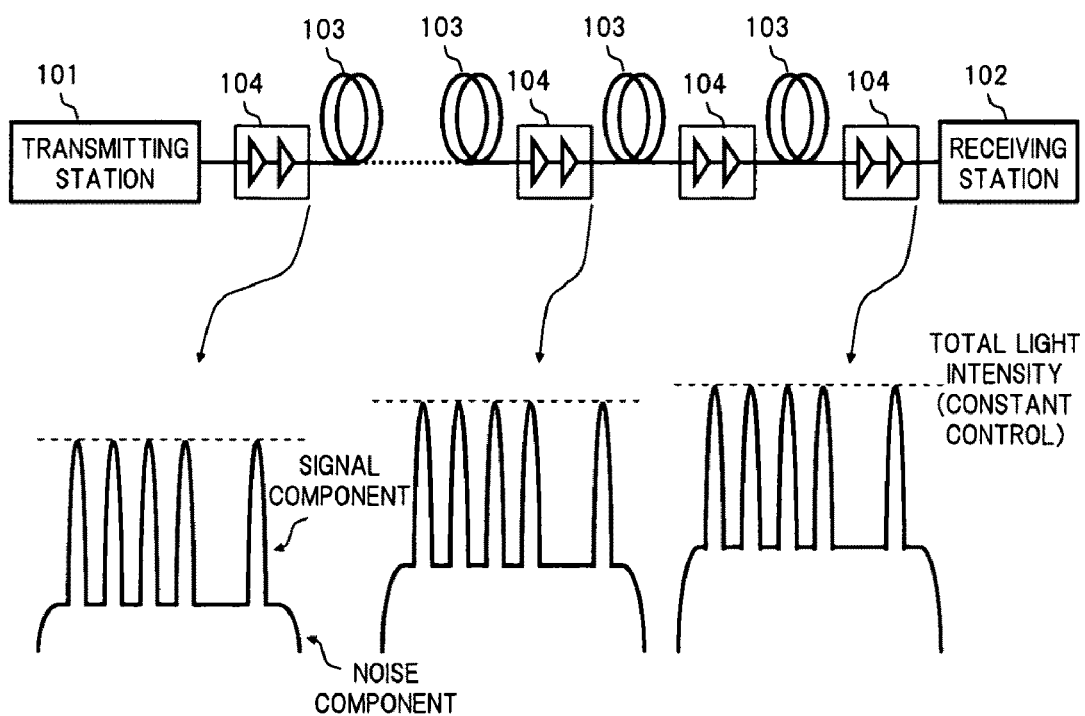
FIG. 17 is a diagram illustrating an example of a conventional WDM optical transmission system in which a control target value of total light intensity is corrected to thereby suppress OSNR deterioration.
Figure 18:
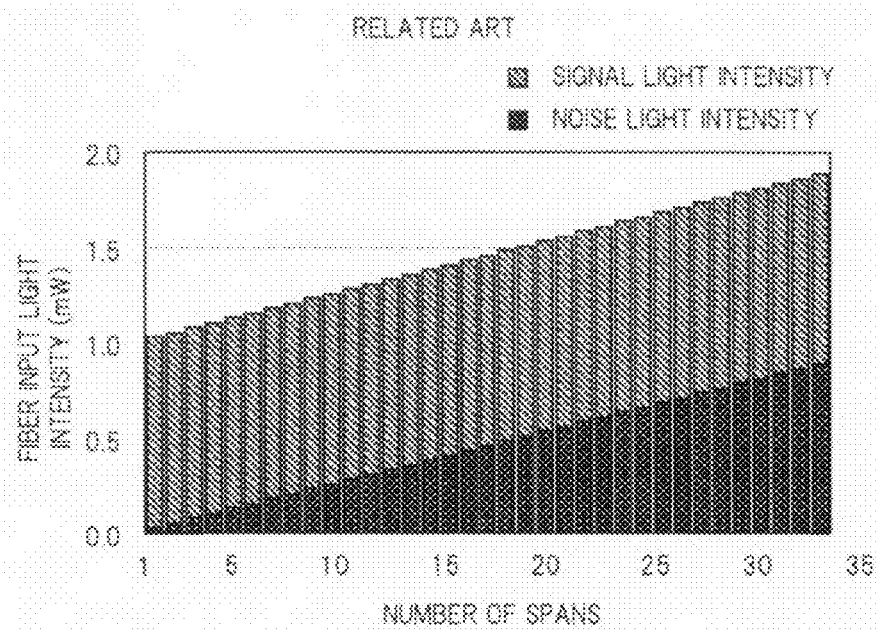
FIG. 18 is a diagram illustrating changes in the proportion of signal light intensity and noise light intensity according to the number of spans, in the system of FIG. 17.
Figure 19:
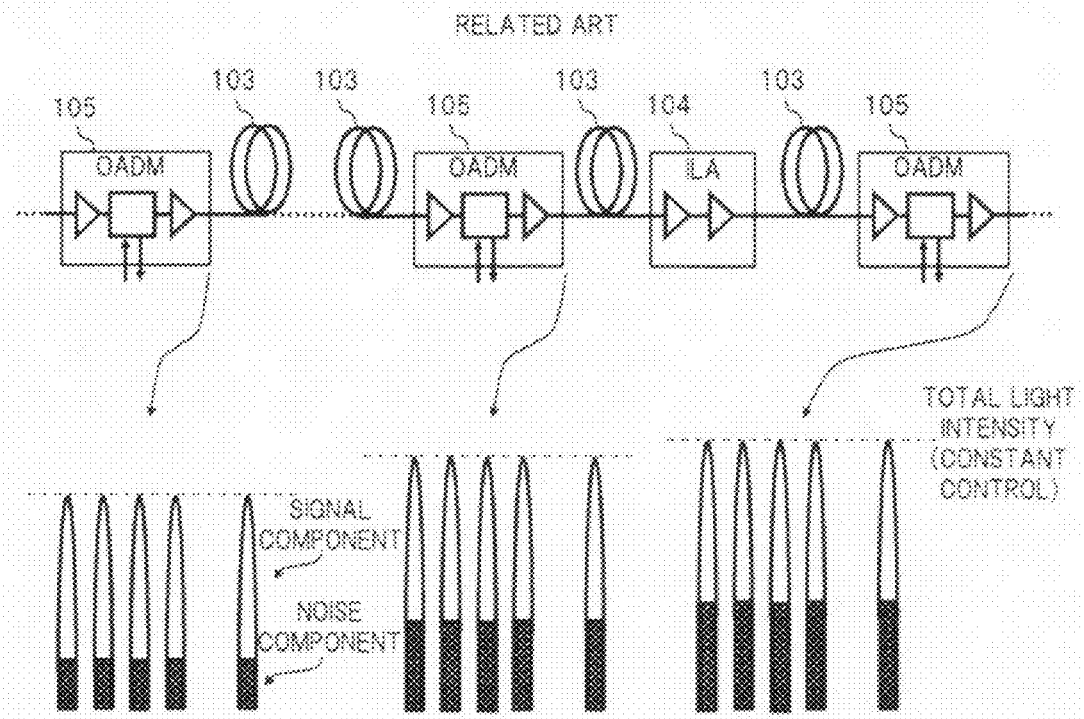
FIG. 19 is a diagram illustrating an example in which a conventional control with correction is applied to a WDM optical transmission system where OADM nodes and optical repeater nodes are both present on a transmission path.
Figure 20:
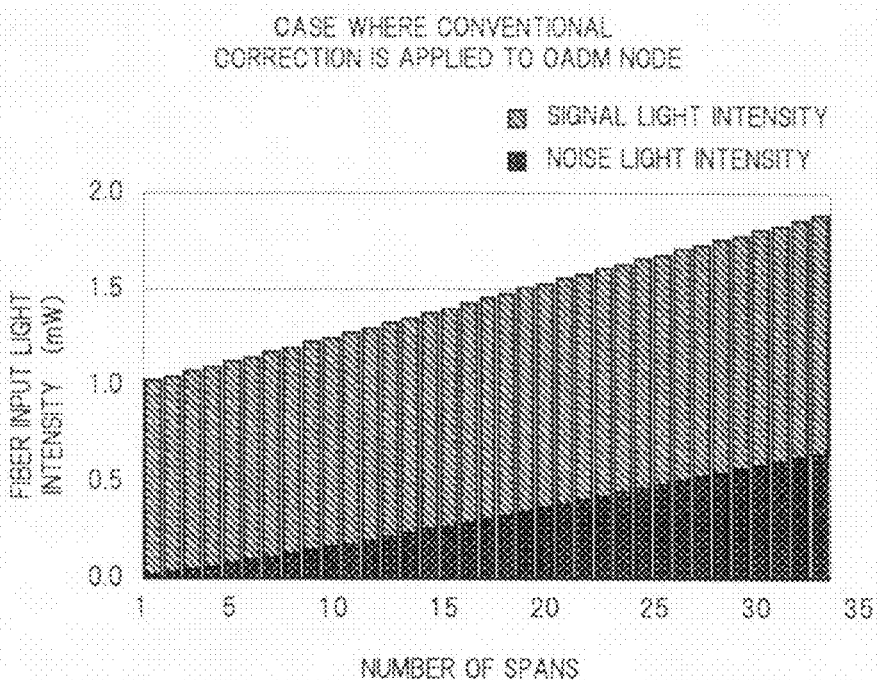
FIG. 20 is a diagram illustrating changes in the proportion of signal light intensity and noise light intensity according to the number of spans, in a case related to the system of FIG. 19 where the OADM nodes are arranged in multiple stages on a transmission path.
Figure 21:
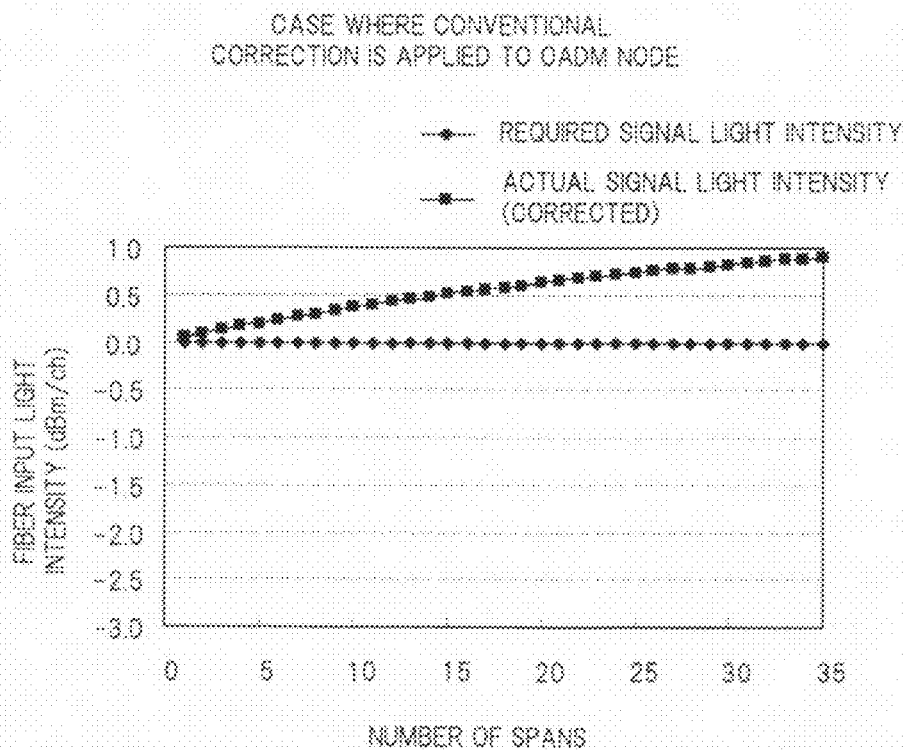
FIG. 21 is a diagram illustrating changes in signal light intensity with respect to increases in the number of spans in FIG. 20.

The correction of the control target value of the total light intensity corresponding to the optical repeater node is a processing similar to that of the conventional correction that takes account of accumulation of optical noise that occurs in the optical amplifier illustrated in FIG. 17 and FIG. 18 mentioned above. On the other hand, the correction of the control target value of the total light intensity corresponding to the OADM node is a processing that takes account of not only accumulation of optical noise that occurs in the optical amplifier but also influence of noise components to be removed by filtering when demultiplexing individual channels in the OADM unit 14.

Specifically, the processing of correcting the total light intensity corresponding to the OADM node is such that a noise cut ratio parameter NCR is defined according to the filtering characteristic of each channel in the OADM unit 14, and the correction is performed according to a calculation expression using this noise cut ratio NCR, to thereby eliminate the influence of noise components to be removed in the OADM unit 14. The above noise cut ratio NCR is defined as a parameter that expresses a proportion of the noise component contained in one channel that has been filtered in the OADM unit 14 with respect to the noise component per one channel of the WDM light before being filtered in the OADM unit 14.

Figure 9:
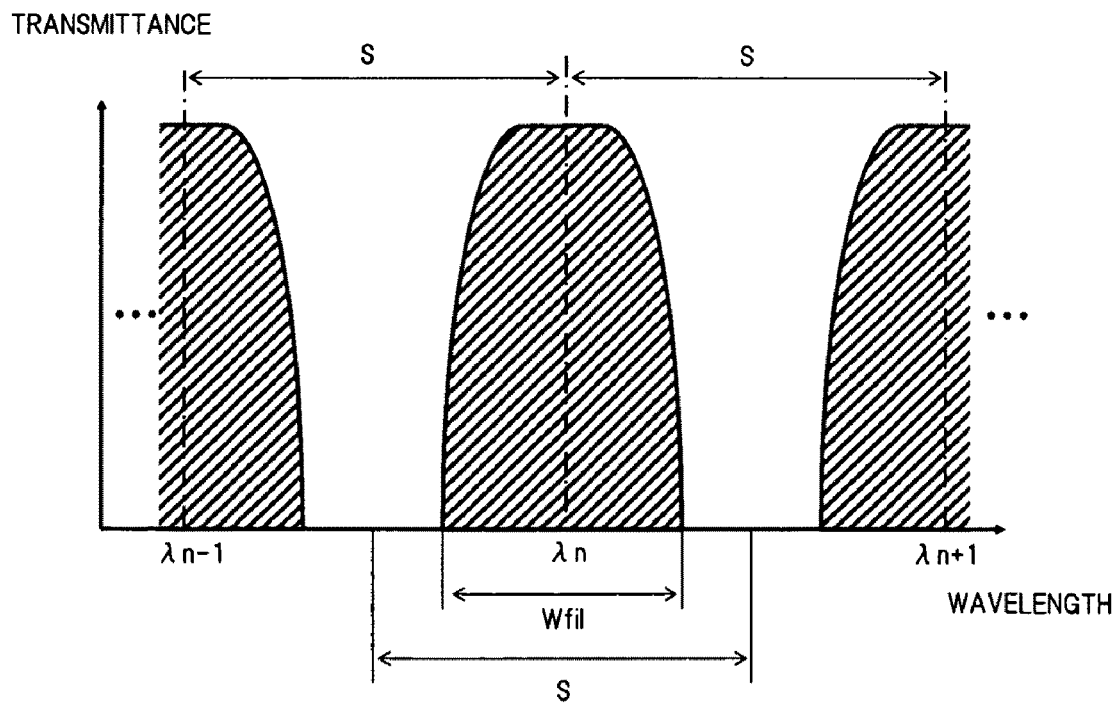
FIG. 9 is a conceptual diagram for describing a relationship between a filtering characteristic and noise cut ratio of the OADM unit in the embodiment.

FIG. 9 is a conceptual diagram for describing a relationship between the filtering characteristic and the noise cut ratio NCR of the OADM unit 14. The filtering characteristic of the OADM unit 14 has transmission bands (oblique line portions in FIG. 9) respectively corresponding to the central wavelengths λn (n=1, 2, 3, . . . ) of each channel of the input WDM light. The width of each transmission band (filter band width) Wfil is set to be narrower than a wavelength interval (channel interval) S between adjacent channels, to thereby enable demultiplexing of the WDM light into individual channels. With respect to such a filtering characteristic, with a focus on one channel (for example, a channel of the central wavelength λn), the noise cut ratio NCR expresses a proportion of the noise component present within a range of the filter band width Wfil that corresponds to transmission noise after filtering, with respect to the noise component present within a range of the channel interval S with the wavelength λn in the center in the WDM light before filtering. Such a noise cut ratio NCR can also be defined simply as a proportion of the filter band width Wfil with respect to the channel interval S (NCR=Wfil/S).

Having defined the noise cut ration NCR for the OADM unit 14 as described above, the processing of correcting the total light intensity corresponding to the OADM node is executed according to the following relational expression. First, the OSNR of a given channel of the WDM light is expressed by the following expression (1) where the signal light intensity of the channel is taken as SIG [mW], and the noise light intensity for when the band width of the channel is 0.1 nm is taken as $ASE_{0.1}$ [mW].

$$OSNR = SIG/ASE_{0.1} \quad (1)$$

Moreover, if the noise light intensity before filtering for one channel of the WDM light, that is, the noise light intensity in the case where the band width of the channel is the above-mentioned channel interval S [nm] is taken as $ASE_{TOTAL}$ [mW], this $ASE_{TOTAL}$ is expressed by the following expression (2) using the noise cut ratio NCR and the above relational expression (1).

$$ASE_{TOTAL} = \left(\frac{S}{0.1}\right) \cdot NCR \cdot ASE_{0.1} \quad (2)$$

$$= \left(\frac{S}{0.1}\right) \cdot NCR \cdot \left(\frac{SIG}{OSNR}\right)$$

Furthermore, if the total light intensity is taken as TOTAL [mW] for when the band width of one channel is considered to be the channel interval S, this TOTAL is a sum of the signal light intensity SIG and the noise light intensity $ASE_{TOTAL}$, and can be expressed by the following expression (3) using the above relational expression (2).

$$TOTAL = SIG + ASE_{TOTAL} \quad (3)$$

$$= SIG + \left(\frac{S}{0.1}\right) \cdot NCR \cdot \left(\frac{SIG}{OSNR}\right)$$

$$= SIG \cdot \left\{1 + \left(\frac{S}{0.1}\right) \cdot \frac{NCR}{OSNR}\right\}$$

From the expression (3) above, the signal light intensity SIG is expressed by the following expression (4) where the total light intensity TOTAL and OSNR are taken as parameters (monitor values).

$$SIG = TOTAL/\{1+(S/0.1)*NCR/OSNR\} \quad (4)$$

Then if the control target value of the total light intensity of one channel is taken as $TOTAL_{TARGET}$, and a correction value for this $TOTAL_{TARGET}$ that takes account of noise light is $TOTAL_{COMP}$, this $TOTAL_{COMP}$ is expressed by the following expression (5).

$$TOTAL_{COMP} = TOTAL_{TARGET} \cdot \left(\frac{TOTAL}{SIG}\right) \quad (5)$$

$$= \frac{TOTAL_{TARGET} \cdot TOTAL}{\left[\frac{TOTAL}{\left\{1+\left(\frac{S}{0.1}\right) \cdot \frac{NCR}{OSNR}\right\}}\right]}$$

$$= TOTAL_{TARGET} \cdot \left\{1 + \left(\frac{S}{0.1}\right) \cdot \frac{NCR}{OSNR}\right\}$$

Therefore, correction of the control target value of the total light intensity of one channel is executed with a calculation processing according to the above relational expression (5).

The correction processing of the total light intensity corresponding to the optical repeater node (conventional correction processing) differs from such correction processing described above for the total light intensity corresponding to the OADM node in that no noise cut ratio NCR is introduced in the above expressions (2) to (5). That is to say, if a correction value for the total light intensity corresponding to the optical repeater node is taken as $TOTAL_{COMP}'$, this $TOTAL_{COMP}'$ is calculated according to the following relational expression (6).

$$TOTAL'_{COMP} = TOTAL_{TARGET} \cdot \left(\frac{TOTAL}{SIG}\right) \quad (6)$$

$$= TOTAL_{TARGET} \cdot \frac{TOTAL}{\left[\frac{TOTAL}{\left\{1+\frac{\left(\frac{S}{0.1}\right)}{OSNR}\right\}}\right]}$$

$$= TOTAL_{TARGET} \cdot \left\{1 + \frac{\left(\frac{S}{0.1}\right)}{OSNR}\right\}$$

Figure 10:
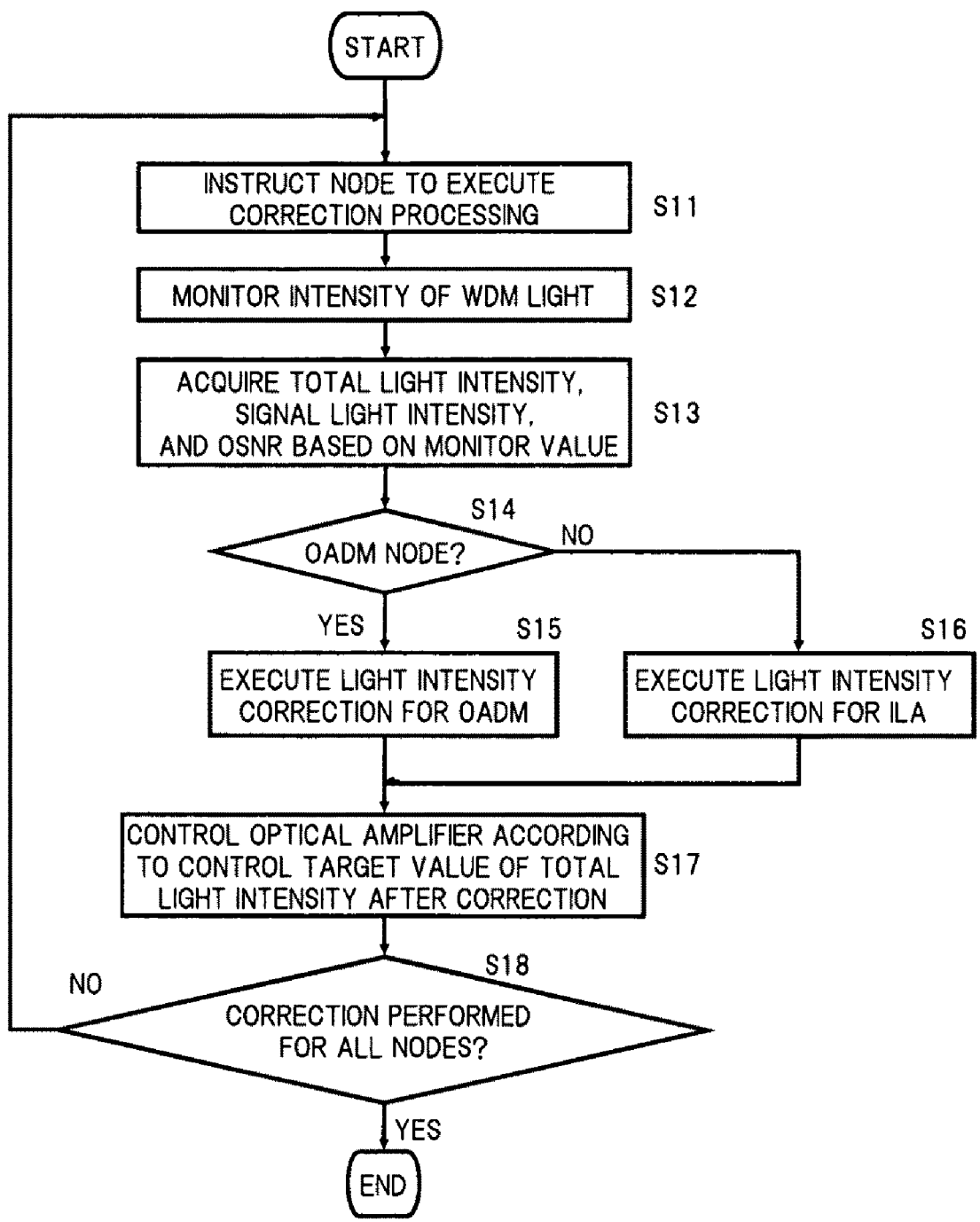
FIG. 10 illustrates an example of a procedure for controlling the intensity of output light in the embodiment.

Here, an example of a control procedure of the output light intensity at each node is described, with reference to the procedure of FIG. 10.

In the WDM optical transmission system of the present embodiment, under the management by the system management section 3, the correction processing of the control target value of the total light intensity at each node on the transmission path is sequentially executed. Here, for example, the correction processing is performed in ascending order of node numbers uniquely set to the respective nodes. However, the order of performing the correction processing at the respective nodes is not limited to this one example.

Specifically, in FIG. 10, when the correction processing of the control target value of the total light intensity for each node on the transmission path is commenced, first, the system management section 3 sends a signal to the first node with an instruction to execute the correction processing (S11). At the first node that has received the signal, the intensity or the like of the WDM light to be output from its own node to the transmission path 1 is monitored by the light intensity monitor 17 (S12). The monitoring result is transmitted to the correction value calculation section 18, and then there are acquired respective values of the total light intensity TOTAL, the signal light intensity SIG, and the OSNR, for one channel of the WDM light (S13).

Then in the correction value calculation section 18, using node type information transmitted from the system management section 3, there is performed a determination of whether its own node is an OADM node or an optical repeater node (S14). In the case where it is an OADM node, the control target value of the total light intensity is corrected according to the above relational expression (5) (S15), and in the case where it is an optical repeater node, the control target value of the total light intensity is corrected according to the above relational expression (6) (S16). When the correction result has been transmitted from the correction value calculation section 18 to the gain control section 19, gain of the optical amplifier 15 is feedback-controlled according to the control target value of the total light intensity after correction (S17). When the feedback control of the optical amplifier 15 has been completed, it is determined whether the correction processing of the control target value of the total light intensity has been performed for all of the nodes on the transmission path (S18), and if there is a node that has not been processed, the procedure returns to step S11 and the above respective processings are repeated.

Figure 11:
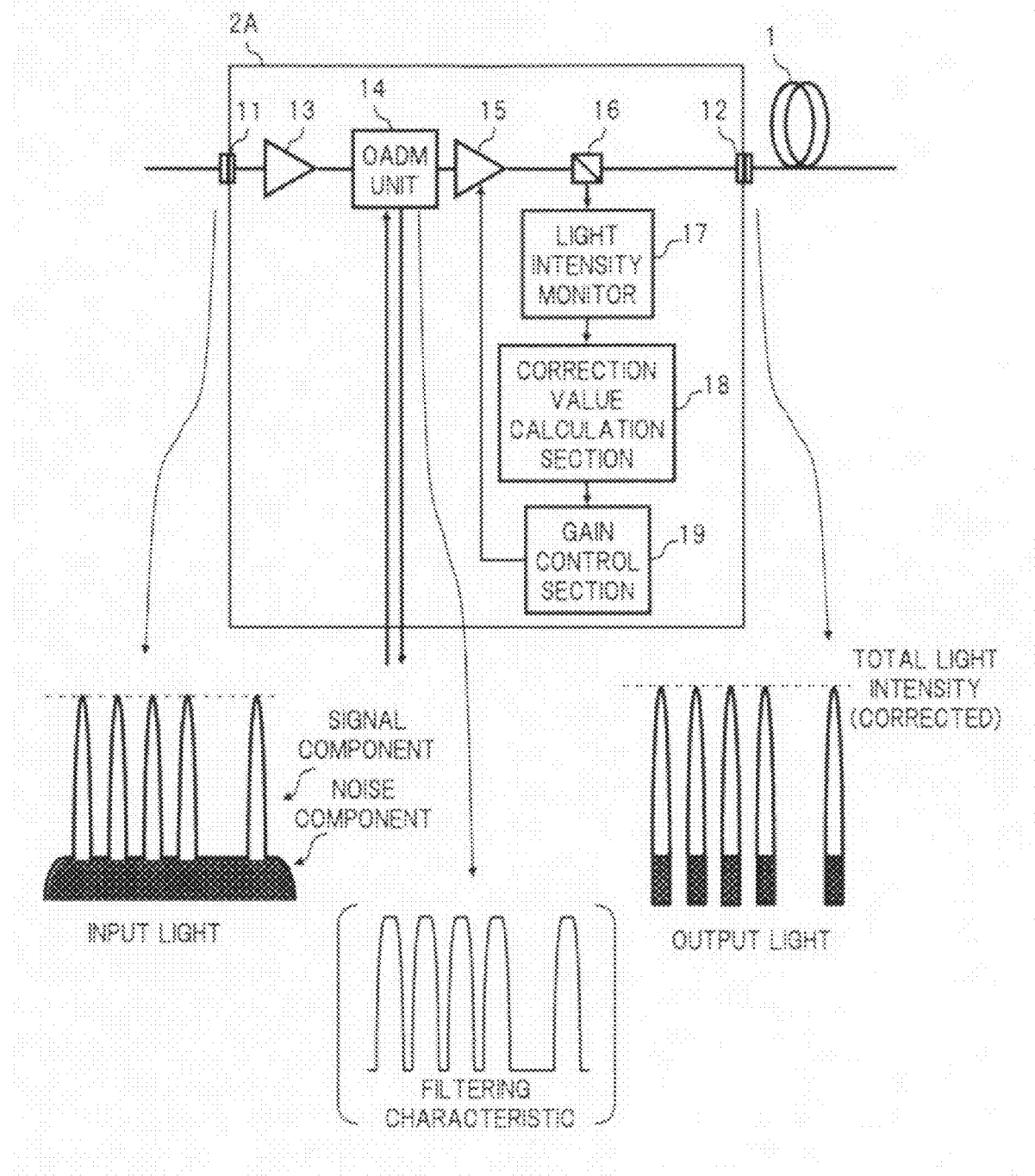
FIG. 11 is a diagram illustrating an aspect of a control of WDM light intensity at an OADM node in the embodiment.

With the series of processings described above, in the OADM node 2A on the transmission path, as illustrated in FIG. 11, even if the noise component distributed across the intermediate wavelength region of each channel is removed due to the filtering characteristic of the OADM unit 14, correction processing in which the noise cut ratio parameter NCR is introduced, is performed. Therefore, a situation of excessive correction due to the noise component being estimated at a level greater than the actual level as conventionally done is avoided. On the other hand, in the optical repeater node 2B on the transmission path, there is performed a correction processing similar to the conventional processing that takes account of noise light accumulation, and therefore OSNR deterioration is suppressed.

Figure 12:
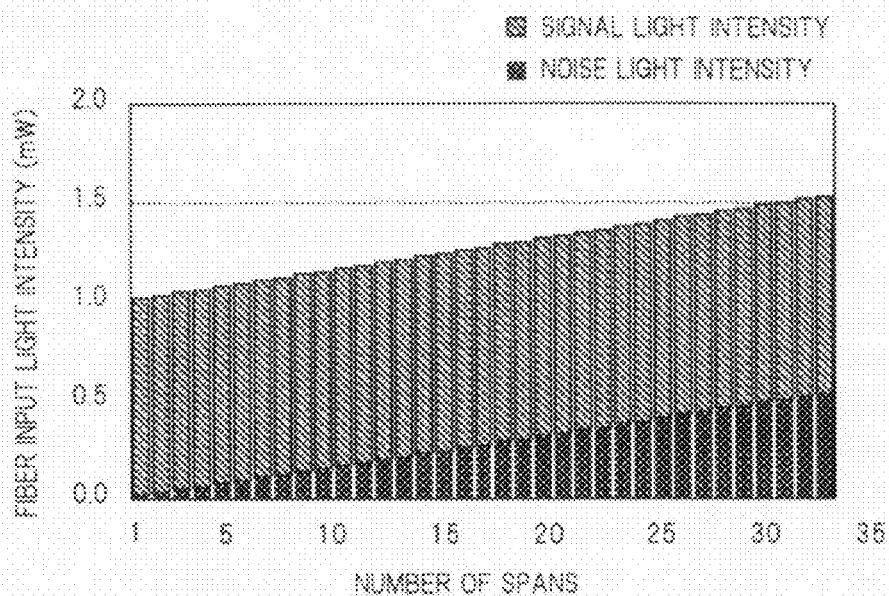
FIG. 12 is a diagram illustrating changes in the proportion of signal light intensity and noise light intensity according to the number of spans, in a case related to the embodiment where the OADM nodes are arranged in multiple stages on a transmission path.
Figure 13:
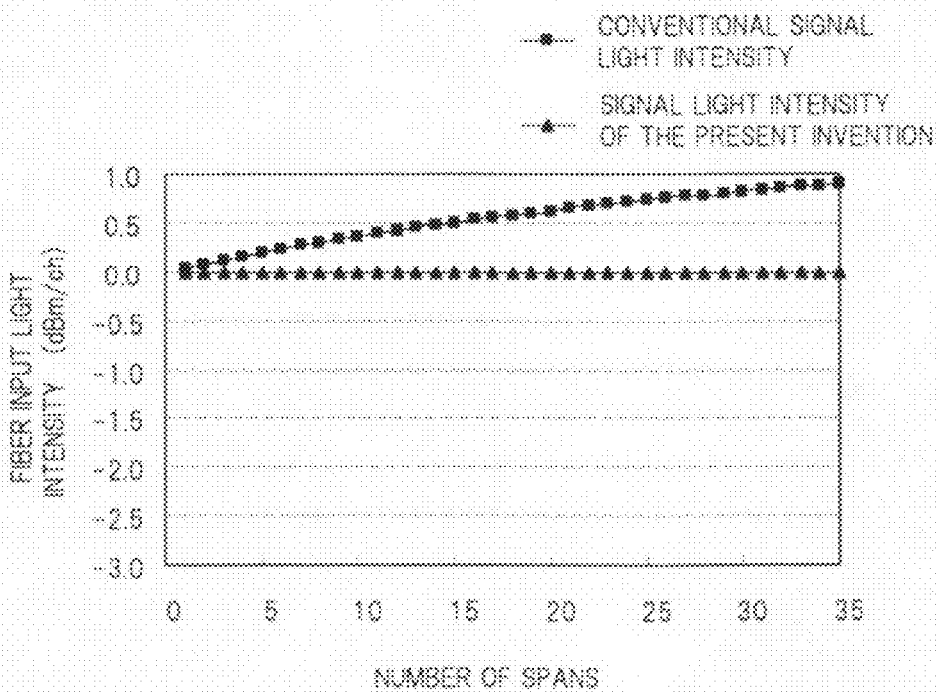
FIG. 13 is a diagram illustrating an example where changes in signal light intensity with respect to increases in the number of spans in FIG. 12, are compared with those in the conventional technique.

FIG. 12 is an example illustrating changes in the proportion of signal light intensity and noise light intensity according to the number of spans, when performing light intensity control by executing correction processing with the noise cut ratio NCR introduced therein, in the case where the OADM nodes are arranged in multiple stages on the transmission path. Moreover, FIG. 13 is an example to compare, between the present invention and the conventional technique, changes in the signal light intensity of one channel with respect to increases in the number of spans. From these diagrams it can be seen that the signal light intensity of each channel of the WDM light output from the OADM node is controlled to a constant level at a high accuracy even when the number of spans increases. Therefore, according to the present WDM optical transmission system, even if the OADM node 2A and the optical repeater node 2B are both present on the transmission path, it is possible to control the signal light intensity of each channel of the WDM light output from each node to a constant level at a high accuracy, and excellent transmission quality can be realized.

In the above embodiment, there has been described an example in which the OADM node and the optical repeater node are both present on the transmission path. However, the types of nodes on the transmission path in the present invention are not limited to the above one example. For example, the present invention is also effective in the case where on the transmission path there is included a dispersion compensation node that after demultiplexing the WDM light into individual channels, performs chromatic dispersion compensation for each channel, and then again multiplexes respective channels to be output to the transmission path. In this case, in correction processing of the control target value of the total light intensity in the dispersion compensation node, processing similar to that in the case of the abovementioned OADM node is executed.

Moreover, in the embodiment described above, there has been described a case where information related to the type of the node is transmitted from the system management section to each node. However, the correction value calculation section of each node may have the type of its own node preliminarily set therein. However, by preliminarily having the node type to be transmitted from the system management section, it is possible to easily address addition, modification and so forth of the node function after a system startup.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:
1. A WDM optical transmission system comprising:
a transmission path through which wavelength division multiplexing (WDM) light containing a plurality of channels with different wavelengths is transmitted;
at least one first node that is arranged on the transmission path, and that demultiplexes WDM light input from the transmission path into individual channels, and then performs a predetermined processing for each channel, and amplifies the WDM light with the multiplexed respective processed channels with an optical amplifier to be output to the transmission path; and
at least one second node that is arranged on the transmission path, and that amplifies the WDM light input from the transmission path without demultiplexing it into individual channels, with an optical amplifier to be output to the transmission path,
wherein:
the first node and the second node each have: a light intensity monitor that monitors the intensity of the WDM light amplified by the optical amplifier within its own node; a gain control section that controls gain of the optical amplifier according to the monitoring results of the light intensity monitor, so that the total light intensity combining signal components and noise components per one channel of the WDM light output from its own node to the transmission path, becomes constant at a preliminarily set control target value; and a correction value calculation section that, based on the monitoring results of the light intensity monitor, finds the proportion of the signal light intensity and the noise light intensity of one channel of the WDM light, and corrects the control target value of the total light intensity to be used in the gain control section so that the signal light intensity of one channel becomes constant in all of the nodes; and
the correction value calculation section determines whether its own node corresponds to either of the first node and the second node, and when it corresponds to the first node, it performs a correction of the control target value of the total light intensity according to a calculation expression with use of a noise cut ratio defined according to a filtering characteristic for when demultiplexing the WDM light into individual channels.
2. A WDM optical transmission system according to claim 1, wherein the noise cut ratio is a proportion, with respect to noise components per one channel in the WDM light before being demultiplexed into individual channels, of noise components contained in one channel after being demultiplexed into individual channels.

3. A WDM optical transmission system according to claim 2, wherein
the noise cut ratio is a proportion, with respect to a wavelength interval of adjacent channels of the WDM light, of a width of a transmission band corresponding to each channel in the filtering characteristic.

4. A WDM optical transmission system according to claim 1, wherein
the first node is an OADM node that performs add/drop processing with respect to each demultiplexed channel.

5. A WDM optical transmission system according to claim 4, wherein
the OADM node has: an input side optical amplifier that amplifies WDM light to be input from the transmission path; an OADM unit that demultiplexes the WDM light amplified by the input side optical amplifier into individual channels to perform add/drop processing, and that multiplexes the processed respective channels to be output; and a second optical amplifier that amplifies the WDM light output from the OADM unit,
and the intensity of the WDM light amplified by the second optical amplifier is monitored by the light intensity monitor, and the gain control section feedback-controls gain of the second optical amplifier.

6. A WDM optical transmission system according to claim 5, wherein
the OADM unit includes a wavelength selective switch (WSS).

7. A WDM optical transmission system according to claim 5, wherein
the OADM unit includes an arrayed waveguide grating (AWG).

8. A WDM optical transmission system according to claim 1, wherein
the first node is a dispersion compensation node that compensates chromatic dispersion with respect to each demultiplexed channel.

9. A WDM optical transmission system according to claim 1, wherein
the second node is an optical repeater node that amplifies all together with an in-line amplifier, the respective channels of the WDM light input from the transmission path.

10. A WDM optical transmission system according to claim 1, further comprising:
a system management section that transmits system management information to each node on the transmission path to thereby perform central management of the operating state of the respective nodes,
and the correction value calculation section determines, based on information related to node types transmitted from the system management section, whether its own node corresponds to either of the first node and the second node.

11. A WDM optical transmission system according to claim 10, wherein
the light intensity monitor monitors the total sum of the light intensity of all channels contained in the WDM light amplified by the optical amplifier, and
the correction value calculation section: uses monitoring results of the light intensity monitor and information related to the number of channels of the WDM light transmitted from the system management section to calculate a total light intensity per one channel; uses the total light intensity, and an optical signal to noise ratio (OSNR) transmitted from the system management section, to calculate a signal light intensity of one channel of the WDM light; and uses the calculated total light intensity and the signal light intensity, or the OSNR value, to correct a control target value of the total light intensity.

12. A WDM optical transmission system according to claim 10, wherein
the light intensity monitor monitors the total light intensity, the signal light intensity, and the optical signal to noise ratio (OSNR), per one channel of the WDM light amplified by the optical amplifier, and
the correction value calculation section uses respective monitor values of the light intensity monitor to correct a control target value of the total light intensity.

13. A method for controlling a WDM optical transmission system comprising: a transmission path through which wavelength division multiplexing (WDM) light containing a plurality of channels with different wavelengths is transmitted; a first node that is arranged on the transmission path, and that demultiplexes WDM light input from the transmission path into individual channels, and then performs a predetermined processing for each channel, and amplifies the WDM light with the multiplexed respective processed channels with an optical amplifier to be output to the transmission path; and a second node that is arranged on the transmission path, and that amplifies the WDM light input from the transmission path without demultiplexing it into individual channels, to be output to the transmission path,
and that controls gain of the optical amplifier in each node so that a total light intensity that combines signal components and noise components per one channel of the WDM light output from the first and second nodes to the transmission path becomes constant at a preliminarily set control target value, wherein the method comprising:
monitoring, in the first node and the second node, the intensity of the WDM light amplified by the optical amplifier within its own node;
finding, based on the intensity of the monitored WDM light, a proportion of the signal light intensity and noise light intensity of one channel of the WDM light, and correcting a control target value of the total light intensity so that the signal light intensity of one channel becomes constant in all of the nodes; and
controlling gain of the optical amplifier in its own node so that the total light intensity per one channel of the WDM light output from its own node to the transmission path becomes constant at the corrected control target value of the total light intensity, according to the intensity of the monitored WDM light;
and is further characterized in that
the operation for correcting the control target value of the total light intensity determines whether its own node corresponds to either of the first node and the second node, and when it corresponds to the first node, corrects the control target value of the total light intensity according to a calculation expression with use of a noise cut ratio defined according to a filtering characteristic for when demultiplexing the WDM light into individual channels.

* * * * *

UNITED STATES PATENT AND TRADEMARK OFFICE
CERTIFICATE OF CORRECTION

PATENT NO.         : 8,086,106 B2
APPLICATION NO.    : 12/453063
DATED              : December 27, 2011
INVENTOR(S)        : Kentaro Nakamura It is certified that error appears in the above-identified patent and that said Letters Patent is hereby corrected as shown below:

Claim 12, Column 14, line 9, change "AWDM" to -- A WDM --.

Signed and Sealed this
Thirteenth Day of March, 2012

David J. Kappos
*Director of the United States Patent and Trademark Office*